(12) United States Patent
Sharma et al.

(10) Patent No.: US 10,769,761 B2
(45) Date of Patent: Sep. 8, 2020

(54) GENERATING HIGH RESOLUTION IMAGES FROM LOW RESOLUTION IMAGES FOR SEMICONDUCTOR APPLICATIONS

(71) Applicant: KLA-Tencor Corporation, Milpitas, CA (US)

(72) Inventors: Saurabh Sharma, Faridabad (IN); Amitoz Singh Dandiana, Chennai (IN); Mohan Mahadevan, Livermore, CA (US); Chao Fang, Sunnyvale, CA (US); Amir Azordegan, Santa Clara, CA (US); Brian Duffy, San Jose, CA (US)

(73) Assignee: KLA-Tencor Corp., Milpitas, CA (US)

( * ) Notice: Subject to any disclaimer, the term of this patent is extended or adjusted under 35 U.S.C. 154(b) by 135 days.

(21) Appl. No.: 16/019,422

(22) Filed: Jun. 26, 2018

(65) Prior Publication Data

US 2019/0005629 A1     Jan. 3, 2019

Related U.S. Application Data

(60) Provisional application No. 62/545,906, filed on Aug. 15, 2017.

(30) Foreign Application Priority Data

Jun. 30, 2017     (IN) .............................. 2017/41023063

(51) Int. Cl.
   *G06T 5/00*     (2006.01)
   *G06T 3/40*     (2006.01)
(52) U.S. Cl.
   CPC ............ *G06T 5/007* (2013.01); *G06T 3/4053* (2013.01); *G06T 2207/20084* (2013.01); *G06T 2207/20208* (2013.01)

(58) Field of Classification Search
   None
   See application file for complete search history.

(56) References Cited

U.S. PATENT DOCUMENTS

| 8,126,255 B2 | 2/2012 | Bhaskar et al. |
| 8,664,594 B1 | 4/2014 | Jiang et al. |
| | (Continued) | |

FOREIGN PATENT DOCUMENTS

JP     2017-083270     5/2017

OTHER PUBLICATIONS

Dong et al., "Learning a deep convolutional network for image super-resolution," 13th European Conference on Computer Vision, Sep. 2014, LNCS 8692, pp. 184-199.

(Continued)

*Primary Examiner* — Dov Popovici
(74) *Attorney, Agent, or Firm* — Ann Marie Mewherter

(57) ABSTRACT

Methods and systems for generating a high resolution image for a specimen from a low resolution image of the specimen are provided. One system includes one or more computer subsystems configured for acquiring a low resolution image of a specimen. The system also includes one or more components executed by the one or more computer subsystems. The one or more components include a deep convolutional neural network that includes one or more first layers configured for generating a representation of the low resolution image. The deep convolutional neural network also includes one or more second layers configured for generating a high resolution image of the specimen from the representation of the low resolution image. The second layer(s) include a final layer configured to output the high resolution image and configured as a sub-pixel convolutional layer.

24 Claims, 9 Drawing Sheets

(56) References Cited

U.S. PATENT DOCUMENTS

| | | | |
|---|---|---|---|
| 8,692,204 | B2 | 4/2014 | Kojima et al. |
| 8,698,093 | B1 | 4/2014 | Gubbens et al. |
| 8,716,662 | B1 | 5/2014 | MacDonald et al. |
| 9,222,895 | B2 | 12/2015 | Duffy et al. |
| 2011/0194752 | A1 | 8/2011 | Pang |
| 2015/0086131 | A1 | 3/2015 | Wang et al. |
| 2015/0324965 | A1 | 11/2015 | Kulkarni et al. |
| 2019/0095795 | A1* | 3/2019 | Ren .................. G06N 3/0454 |
| 2019/0139205 | A1* | 5/2019 | El-Khamy ............ G06T 5/003 |

OTHER PUBLICATIONS

Freeman et al., "Metamers of the ventral stream," Nature Neuroscience, 14(9), 1195-1201, Sep. 2011.

Gatys et al., "A Neural Algorithm of Artistic Style," arXiv:1508.06576, Sep. 2, 2015, 16 pages.

Gatys et al., "Texture Synthesis Using Convolutional Neural Networks," arXiv:1505.07376, Nov. 6, 2015, 10 pages.

Goodfellow et al., "Generative Adversarial Nets," arXiv:1406.2661, Jun. 10, 2014, 9 pages.

Hand et al., "Principles of Data Mining (Adaptive Computation and Machine Learning)," MIT Press, Aug. 1, 2001, 322 pages.

International Search Report for PCT/US2018/040160 dated Nov. 14, 2018.

Jebara, "Discriminative, Generative, and Imitative Learning," MIT Thesis, Feb. 2002, 212 pages.

Johnson et al., "Perceptual Losses for Real-Time Style Transfer and Super-Resolution," Mar. 27, 2016, arXiv:1603.08155, 18 pages.

Nasrollahi et al., "Super-resolution: A comprehensive survey," Machine Vision & Applications, vol. 25, No. 6, pp. 1423-1468, May 13, 2014.

Radford et al., "Unsupervised Representation Learning with Deep Convolutional Generative Adversarial Networks," arXiv: 1511.06434, Jan. 7, 2016, 16 pages.

Shi et al., "Real-Time Single Image and Video Super-Resolution Using an Efficient Sub-Pixel Convolutional Neural Network," Sep. 23, 2016, arXiv:1609.05158v2, 10 pages.

Simonyan et al., "Very Deep Convolutional Networks for Large-Scale Image Recognition," arXiv:1409.1556v6, Apr. 10, 2015, 14 pages.

Sugiyama, "Introduction to Statistical Machine Learning," Morgan Kaufmann, Oct. 9, 2015, 400 pages.

U.S. Appl. No. 15/697,426, filed Sep. 6, 2017 by He et al. (submitted as U.S. Patent Application Publication No. 2019/0073568 published Mar. 7, 2019).

* cited by examiner

GENERATING HIGH RESOLUTION IMAGES FROM LOW RESOLUTION IMAGES FOR SEMICONDUCTOR APPLICATIONS

BACKGROUND OF THE INVENTION

1. Field of the Invention

The present invention generally relates to methods and systems for generating high resolution images from low resolution images for semiconductor applications.

2. Description of the Related Art

The following description and examples are not admitted to be prior art by virtue of their inclusion in this section.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on specimens to drive higher yield in the manufacturing process and thus higher profits. Inspection has always been an important part of fabricating semiconductor devices. However, as the dimensions of semiconductor devices decrease, inspection becomes even more important to the successful manufacture of acceptable semiconductor devices because smaller defects can cause the devices to fail.

Defect review typically involves re-detecting defects detected as such by an inspection process and generating additional information about the defects at a higher resolution using either a high magnification optical system or a scanning electron microscope (SEM). Defect review is therefore performed at discrete locations on specimens where defects have been detected by inspection. The higher resolution data for the defects generated by defect review is more suitable for determining attributes of the defects such as profile, roughness, more accurate size information, etc.

Metrology processes are also used at various steps during a semiconductor manufacturing process to monitor and control the process. Metrology processes are different than inspection processes in that, unlike inspection processes in which defects are detected on specimens, metrology processes are used to measure one or more characteristics of the specimens that cannot be determined using currently used inspection tools. For example, metrology processes are used to measure one or more characteristics of specimens such as a dimension (e.g., line width, thickness, etc.) of features formed on the specimens during a process such that the performance of the process can be determined from the one or more characteristics. In addition, if the one or more characteristics of the specimens are unacceptable (e.g., out of a predetermined range for the characteristic(s)), the measurements of the one or more characteristics of the specimens may be used to alter one or more parameters of the process such that additional specimens manufactured by the process have acceptable characteristic(s).

Metrology processes are also different than defect review processes in that, unlike defect review processes in which defects that are detected by inspection are re-visited in defect review, metrology processes may be performed at locations at which no defect has been detected. In other words, unlike defect review, the locations at which a metrology process is performed on specimens may be independent of the results of an inspection process performed on the specimens. In particular, the locations at which a metrology process is performed may be selected independently of inspection results.

As described above, therefore, due to the limited resolution with which inspection (optical and sometimes electron beam inspection) is performed, the specimen is generally needed to generate additional higher resolution images for defect review of the defects detected on the specimen, which may include verification of the detected defects, classification of the detected defects, and determining characteristics of the defects. In addition, higher resolution images are generally needed to determine information for patterned features formed on the specimen as in metrology regardless of whether defects have been detected in the patterned features. Therefore, defect review and metrology can be time consuming processes that require use of the physical specimen itself and additional tools (in addition to the inspector) needed to generate the higher resolution images.

Defect review and metrology, however, are not processes that can be simply eliminated to save time and money. For example, due to the resolution with which inspection processes are performed, inspection processes do not in general generate image signals or data that can be used to determine information for the detected defects that is sufficient to classify the defects and/or determine a root cause of the defects. In addition, due to the resolution with which inspection processes are performed, inspection processes do not in general generate image signals or data that can be used to determine information for patterned features formed on the specimen with sufficient accuracy.

Accordingly, it would be advantageous to develop systems and methods for generating a high resolution image for a specimen that do not have one or more of the disadvantages described above.

SUMMARY OF THE INVENTION

The following description of various embodiments is not to be construed in any way as limiting the subject matter of the appended claims.

One embodiment relates to a system configured to generate a high resolution image for a specimen from a low resolution image of the specimen. The system includes one or more computer subsystems configured for acquiring a low resolution image of a specimen. The system also includes one or more components executed by the one or more computer subsystems. The one or more components include a deep convolutional neural network that includes one or more first layers configured for generating a representation of the low resolution image. The deep convolutional neural network also includes one or more second layers configured for generating a high resolution image of the specimen from the representation of the low resolution image. The one or more second layers include a final layer configured to output the high resolution image. The final layer is configured as a sub-pixel convolution layer. The system may be further configured as described herein.

An additional embodiment relates to another system configured to generate a high resolution image for a specimen from a low resolution image of the specimen. This system is configured as described above. This system also includes an imaging subsystem configured for generating the low resolution image of the specimen. The computer subsystem(s) are, in this embodiment, configured for acquiring the low resolution image from the imaging subsystem. This embodiment of the system may be further configured as described herein.

Another embodiment relates to a computer-implemented method for generating a high resolution image for a specimen from a low resolution image of the specimen. The method includes acquiring a low resolution image of a specimen. The method also includes generating a representation of the low resolution image by inputting the low resolution image into one or more first layers of a deep convolutional neural network. In addition, the method includes generating a high resolution image for the specimen based on the representation. Generating the high resolution image is performed by one or more second layers of the deep convolutional neural network. The one or more second layers include a final layer configured to output the high resolution image. The final layer is configured as a sub-pixel convolution layer. The acquiring, generating the representation, and generating the high resolution image steps are performed by one or more computer systems. One or more components are executed by the one or more computer systems, and the one or more components include the deep convolutional neural network.

Each of the steps of the method described above may be further performed as described further herein. In addition, the embodiment of the method described above may include any other step(s) of any other method(s) described herein. Furthermore, the method described above may be performed by any of the systems described herein.

Another embodiment relates to a non-transitory computer-readable medium storing program instructions executable on one or more computer systems for performing a computer-implemented method for generating a high resolution image for a specimen from a low resolutions image of the specimen. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

Figure 1:
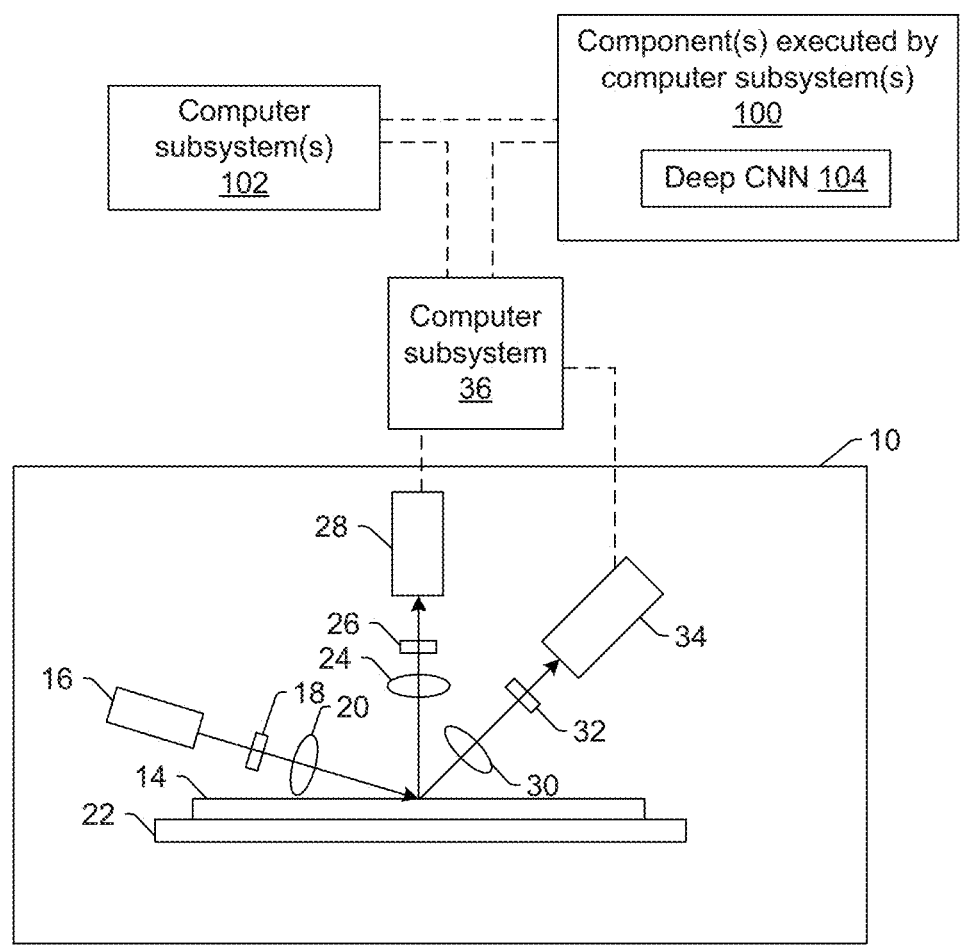
FIGS. 1 and 1a are schematic diagrams illustrating side views of embodiments of a system configured as described herein.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

One embodiment relates to a system configured to generate a high resolution image for a specimen from a low resolution image of the specimen. As described further herein, the embodiments provide platform agnostic, data-driven methods and systems to generate stable and robust metrology quality images. The embodiments can also be used to generate relatively high quality, de-noised, and super-resolved images. The embodiments can further be used to increase imaging throughput. In addition, the embodiments can be used to generate review images from relatively low frame, relatively low electrons per pixel (e/p) inspection scans. ("Low frame" implies fewer numbers of image grabs at the same location, e.g., to get better imaging and increase signal-to-noise ratio, multiple frames are grabbed and then combined to boost image quality. "e/p" is basically electrons per pixel, where a higher e/p implies higher quality but lower throughput. Higher e/p is achieved using beam conditions.)

The embodiments described herein are applicable to electron beam (ebeam), broad band plasma (BBP), laser scattering, limited resolution, and metrology platforms for generating relatively high quality images at a much higher throughput from the images generated by any of those platforms. In other words, images can be generated at relatively high throughput and therefore relatively low resolution by an imaging system and then transformed into relatively high resolution images by the embodiments described herein, which means that the high resolution images can be effectively generated at the relatively high throughput. The embodiments described herein advantageously provide learned transformations between relatively low resolution and relatively high resolution imaging manifolds, noise reduction, and transfer of quality from higher quality scans to lower quality scans. An imaging "manifold" can be generally defined as a theoretical probability space of all possible images.

The term "low resolution image" of a specimen, as used herein, is generally defined as an image in which all of the patterned features formed in the area of the specimen at which the image was generated are not resolved in the image. For example, some of the patterned features in the area of the specimen at which a low resolution image was generated may be resolved in the low resolution image if their size is large enough to render them resolvable. However, the low resolution image is not generated at a resolution that renders all patterned features in the image resolvable. In this manner, a "low resolution image," as that term is used herein, does not contain information about patterned features on the specimen that is sufficient for the low resolution image to be used for applications such as defect review, which may include defect classification and/or verification, and metrology. In addition, a "low resolution image" as that term is used herein generally refers to images generated by inspection systems, which typically have relatively lower resolution (e.g., lower than defect review and/or metrology systems) in order to have relatively fast throughput. In this manner, a "low resolution image" may also be commonly referred to as a high throughput or HT image. For example, in order to generate images at higher throughput, the e/p and the number of frames may be lowered thereby resulting in lower quality scanning electron microscope (SEM) images.

The "low resolution images" may also be "low resolution" in that they have a lower resolution than a "high resolution image" described herein. A "high resolution image" as that term is used herein can be generally defined as an image in which all patterned features of the specimen are resolved with relatively high accuracy. In this manner, all of the patterned features in the area of the specimen for which a high resolution image is generated are resolved in the high resolution image regardless of their size. As such, a "high resolution image," as that term is used herein, contains information about patterned features of the specimen that is sufficient for the high resolution image to be used for applications such as defect review, which may include defect classification and/or verification, and metrology. In addition, a "high resolution image" as that term is used herein generally refers to images that cannot be generated by inspection systems during routine operation, which are configured to sacrifice resolution capability for increased throughput. In this manner, a "high resolution image" may also be referred to herein and in the art as a "high sensitivity image" which is another term for a "high quality image." For example, to generate high quality images, the e/p, frames, etc., may be increased, which generates good quality SEM images but lowers the throughput considerably. These images are then "high sensitivity" images in that they can be used for high sensitivity defect detection.

In contrast to the embodiments described further herein, most older methods use heuristics and cherry-picked parameters to generate relatively noise free images. These methods are usually designed keeping in mind the statistical properties of the images on which they will run and as such cannot be ported to other platforms without incorporating the heuristics of that platform. Some of the well known methods used for noise reduction in images are anisotropic diffusion, bilateral filter, Weiner filter, non-local means, etc. Bilateral and Weiner filters remove noise at the pixel level by using a filter designed from the neighboring pixels. Anisotropic diffusion applies the law of diffusion on images whereby it smoothens the textures/intensities in an image according to the diffusion equations. A threshold function is used to prevent diffusion from happening across edges and therefore it preserves edges in the image to a large extent.

The disadvantages with older methods like Weiner and Bilateral filtering is that these are parametric approaches that need to be fine-tuned at an image level to get the best results. These approaches are not data-driven, which limits the performance they can achieve on challenging imaging types. Another limitation is that most of their processing is done inline which limits the use cases in which they can be used due to throughput limitations.

One embodiment of a system configured to generate a high resolution image for a specimen from a low resolution image of the specimen is shown in FIG. 1. The system includes one or more computer subsystems (e.g., computer subsystem 36 and computer subsystem(s) 102) and one or more components 100 executed by the one or more computer subsystems. In some embodiments, the system includes imaging system (or subsystem) 10 configured to generate the low resolution image of the specimen. In the embodiment of FIG. 1, the imaging system is configured for scanning light over or directing light to a physical version of the specimen while detecting light from the specimen to thereby generate the images for the specimen. The imaging system may also be configured to perform the scanning (or directing) and the detecting with multiple modes.

In one embodiment, the specimen is a wafer. The wafer may include any wafer known in the art. In another embodiment, the specimen is a reticle. The reticle may include any reticle known in the art.

In one embodiment, the imaging system is an optical based imaging system. In one such example, in the embodiment of the system shown in FIG. 1, optical based imaging system 10 includes an illumination subsystem configured to direct light to specimen 14. The illumination subsystem includes at least one light source. For example, as shown in FIG. 1, the illumination subsystem includes light source 16. In one embodiment, the illumination subsystem is configured to direct the light to the specimen at one or more angles of incidence, which may include one or more oblique angles and/or one or more normal angles. For example, as shown in FIG. 1, light from light source 16 is directed through optical element 18 and then lens 20 to specimen 14 at an oblique angle of incidence. The oblique angle of incidence may include any suitable oblique angle of incidence, which may vary depending on, for instance, characteristics of the specimen.

The imaging system may be configured to direct the light to the specimen at different angles of incidence at different times. For example, the imaging system may be configured to alter one or more characteristics of one or more elements of the illumination subsystem such that the light can be directed to the specimen at an angle of incidence that is different than that shown in FIG. 1. In one such example, the imaging system may be configured to move light source 16, optical element 18, and lens 20 such that the light is directed to the specimen at a different oblique angle of incidence or a normal (or near normal) angle of incidence.

In some instances, the imaging system may be configured to direct light to the specimen at more than one angle of incidence at the same time. For example, the illumination subsystem may include more than one illumination channel, one of the illumination channels may include light source 16, optical element 18, and lens 20 as shown in FIG. 1 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen at different angles of incidence may be different such that light resulting from illumination of the specimen at the different angles of incidence can be discriminated from each other at the detector(s).

In another instance, the illumination subsystem may include only one light source (e.g., source 16 shown in FIG. 1) and light from the light source may be separated into different optical paths (e.g., based on wavelength, polarization, etc.) by one or more optical elements (not shown) of the illumination subsystem. Light in each of the different optical paths may then be directed to the specimen. Multiple illumination channels may be configured to direct light to the specimen at the same time or at different times (e.g., when different illumination channels are used to sequentially illuminate the specimen). In another instance, the same illumination channel may be configured to direct light to the specimen with different characteristics at different times. For example, in some instances, optical element 18 may be configured as a spectral filter and the properties of the spectral filter can be changed in a variety of different ways (e.g., by swapping out the spectral filter) such that different wavelengths of light can be directed to the specimen at different times. The illumination subsystem may have any other suitable configuration known in the art for directing the light having different or the same characteristics to the specimen at different or the same angles of incidence sequentially or simultaneously.

In one embodiment, light source 16 may include a broadband plasma (BBP) light source. In this manner, the light generated by the light source and directed to the specimen may include broadband light. However, the light source may include any other suitable light source such as a laser. The laser may include any suitable laser known in the art and may be configured to generate light at any suitable wavelength or wavelengths known in the art. In addition, the laser may be configured to generate light that is monochromatic or nearly-monochromatic. In this manner, the laser may be a narrowband laser. The light source may also include a polychromatic light source that generates light at multiple discrete wavelengths or wavebands.

Light from optical element 18 may be focused onto specimen 14 by lens 20. Although lens 20 is shown in FIG. 1 as a single refractive optical element, it is to be understood that, in practice, lens 20 may include a number of refractive and/or reflective optical elements that in combination focus the light from the optical element to the specimen. The illumination subsystem shown in FIG. 1 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the imaging system may be configured to alter one or more of the elements of the illumination subsystem based on the type of illumination to be used for imaging.

The imaging system may also include a scanning subsystem configured to cause the light to be scanned over the specimen. For example, the imaging system may include stage 22 on which specimen 14 is disposed during inspection. The scanning subsystem may include any suitable mechanical and/or robotic assembly (that includes stage 22) that can be configured to move the specimen such that the light can be scanned over the specimen. In addition, or alternatively, the imaging system may be configured such that one or more optical elements of the imaging system perform some scanning of the light over the specimen. The light may be scanned over the specimen in any suitable fashion such as in a serpentine-like path or in a spiral path.

The imaging system further includes one or more detection channels. At least one of the one or more detection channels includes a detector configured to detect light from the specimen due to illumination of the specimen by the system and to generate output responsive to the detected light. For example, the imaging system shown in FIG. 1 includes two detection channels, one formed by collector 24, element 26, and detector 28 and another formed by collector 30, element 32, and detector 34. As shown in FIG. 1, the two detection channels are configured to collect and detect light at different angles of collection. In some instances, both detection channels are configured to detect scattered light, and the detection channels are configured to detect light that is scattered at different angles from the specimen. However, one or more of the detection channels may be configured to detect another type of light from the specimen (e.g., reflected light).

As further shown in FIG. 1, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 30, element 32, and detector 34 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 1 shows an embodiment of the imaging system that includes two detection channels, the imaging system may include a different number of detection channels (e.g., only one detection channel or two or more detection channels). In one such instance, the detection channel formed by collector 30, element 32, and detector 34 may form one side channel as described above, and the imaging system may include an additional detection channel (not shown) formed as another side channel that is positioned on the opposite side of the plane of incidence. Therefore, the imaging system may include the detection channel that includes collector 24, element 26, and detector 28 and that is centered in the plane of incidence and configured to collect and detect light at scattering angle(s) that are at or close to normal to the specimen surface. This detection channel may therefore be commonly referred to as a "top" channel, and the imaging system may also include two or more side channels configured as described above. As such, the imaging system may include at least three channels (i.e., one top channel and two side channels), and each of the at least three channels has its own collector, each of which is configured to collect light at different scattering angles than each of the other collectors.

As described further above, each of the detection channels included in the imaging system may be configured to detect scattered light. Therefore, the imaging system shown in FIG. 1 may be configured for dark field (DF) imaging of specimens. However, the imaging system may also or alternatively include detection channel(s) that are configured for bright field (BF) imaging of specimens. In other words, the imaging system may include at least one detection channel that is configured to detect light specularly reflected from the specimen. Therefore, the imaging systems described herein may be configured for only DF, only BF, or both DF and BF imaging. Although each of the collectors are shown in FIG. 1 as single refractive optical elements, it is to be understood that each of the collectors may include one or more refractive optical element(s) and/or one or more reflective optical element(s).

The one or more detection channels may include any suitable detectors known in the art. For example, the detectors may include photo-multiplier tubes (PMTs), charge coupled devices (CCDs), time delay integration (TDI) cameras, and any other suitable detectors known in the art. The detectors may also include non-imaging detectors or imaging detectors. In this manner, if the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the imaging system may be signals or data, but not image signals or image data. In such instances, a computer subsystem such as computer subsystem 36 may be configured to generate images of the specimen from the non-imaging output of the detectors. However, in other instances, the detectors may be configured as imaging detectors that are configured to generate image signals or image data. Therefore, the imaging system may be configured to generate the images described herein in a number of ways.

It is noted that FIG. 1 is provided herein to generally illustrate a configuration of an imaging system or subsystem that may be included in the system embodiments described herein or that may generate images that are used by the system embodiments described herein. Obviously, the imaging system configuration described herein may be altered to optimize the performance of the imaging system as is normally performed when designing a commercial imaging system. In addition, the systems described herein may be implemented using an existing system (e.g., by adding functionality described herein to an existing system) such as the 29xx/39xx and Puma 9xxx series of tools that are commercially available from KLA-Tencor, Milpitas, Calif. For some such systems, the embodiments described herein may be provided as optional functionality of the system (e.g., in addition to other functionality of the system). Alternatively, the imaging system described herein may be designed "from scratch" to provide a completely new imaging system.

Computer subsystem 36 of the imaging system may be coupled to the detectors of the imaging system in any suitable manner (e.g., via one or more transmission media, which may include "wired" and/or "wireless" transmission media) such that the computer subsystem can receive the output generated by the detectors during scanning of the specimen. Computer subsystem 36 may be configured to perform a number of functions described further herein using the output of the detectors.

The computer subsystems shown in FIG. 1 (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer subsystem, then the different computer subsystems may be coupled to each other such that images, data, information, instructions, etc. can be sent between the computer subsystems as described further herein. For example, computer subsystem 36 may be coupled to computer subsystem(s) 102 as shown by the dashed line in FIG. 1 by any suitable transmission media, which may include any suitable wired and/or wireless transmission media known in the art. Two or more of such computer subsystems may also be effectively coupled by a shared computer-readable storage medium (not shown).

Figure 1A:
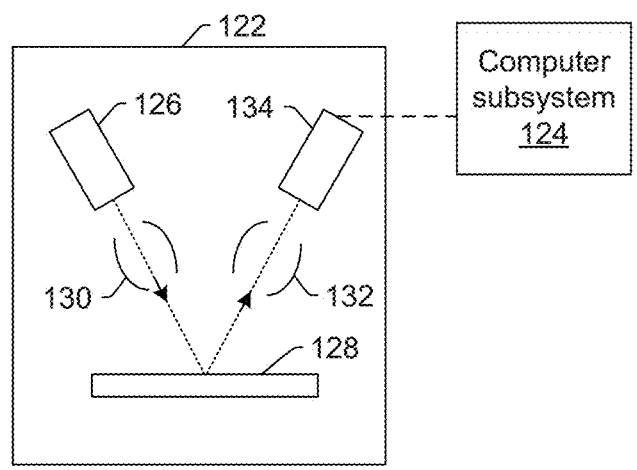

Although the imaging system is described above as being an optical or light-based imaging system, the imaging system may be an electron beam based imaging system. In one such embodiment shown in FIG. 1a, the imaging system includes electron column 122 coupled to computer subsystem 124. As also shown in FIG. 1a, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al., U.S. Pat. No. 8,698,093 issued Apr. 15, 2014 to Gubbens et al., and U.S. Pat. No. 8,716,662 issued May 6, 2014 to MacDonald et al., which are incorporated by reference as if fully set forth herein.

Although the electron column is shown in FIG. 1a as being configured such that the electrons are directed to the specimen at an oblique angle of incidence and are scattered from the specimen at another oblique angle, it is to be understood that the electron beam may be directed to and scattered from the specimen at any suitable angles. In addition, the electron beam based imaging system may be configured to use multiple modes to generate images of the specimen as described further herein (e.g., with different illumination angles, collection angles, etc.). The multiple modes of the electron beam based imaging system may be different in any image generation parameters of the imaging system.

Computer subsystem 124 may be coupled to detector 134 as described above. The detector may detect electrons returned from the surface of the specimen thereby forming electron beam images of the specimen. The electron beam images may include any suitable electron beam images. Computer subsystem 124 may be configured to perform one or more functions described further herein for the specimen using output generated by detector 134. Computer subsystem 124 may be configured to perform any additional step(s) described herein. A system that includes the imaging system shown in FIG. 1a may be further configured as described herein.

It is noted that FIG. 1a is provided herein to generally illustrate a configuration of an electron beam based imaging system that may be included in the embodiments described herein. As with the optical based imaging system described above, the electron beam based imaging system configuration described herein may be altered to optimize the performance of the imaging system as is normally performed when designing a commercial imaging system. In addition, the systems described herein may be implemented using an existing system (e.g., by adding functionality described herein to an existing system) such as the eSxxx and eDR-xxxx series of tools that are commercially available from KLA-Tencor. For some such systems, the embodiments described herein may be provided as optional functionality of the system (e.g., in addition to other functionality of the system). Alternatively, the system described herein may be designed "from scratch" to provide a completely new system.

Figure 2:
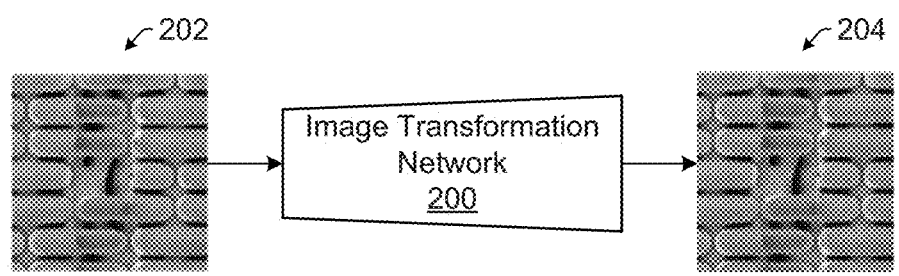
FIG. 2 is a block diagram illustrating one embodiment of a deep convolutional neural network that may be included in the embodiments described herein.

Although the imaging system is described above as being an optical based or electron beam based imaging system, the imaging system may be an ion beam based imaging system. Such an imaging system may be configured as shown in FIG. 2 except that the electron beam source may be replaced with any suitable ion beam source known in the art. In addition, the imaging system may be any other suitable ion beam based imaging system such as those included in commercially available focused ion beam (FIB) systems, helium ion microscopy (HIM) systems, and secondary ion mass spectroscopy (SIMS) systems.

As noted above, the imaging system is configured for scanning energy (e.g., light or electrons) over a physical version of the specimen thereby generating actual images for the physical version of the specimen. In this manner, the imaging system may be configured as an "actual" system, rather than a "virtual" system. For example, a storage medium (not shown) and computer subsystem(s) 102 shown in FIG. 1 may be configured as a "virtual" system. In particular, the storage medium and the computer subsystem(s) are not part of imaging system 10 and do not have any capability for handling the physical version of the specimen. In other words, in systems configured as virtual systems, the output of its one or more "detectors" may be output that was previously generated by one or more detectors of an actual system and that is stored in the virtual system, and during the "scanning," the virtual system may replay the stored output as though the specimen is being scanned. In this manner, scanning the specimen with a virtual system may appear to be the same as though a physical specimen is being scanned with an actual system, while, in reality, the "scanning" involves simply replaying output for the specimen in the same manner as the specimen may be scanned. Systems and methods configured as "virtual" inspection systems are described in commonly assigned U.S. Pat. No. 8,126,255 issued on Feb. 28, 2012 to Bhaskar et al. and U.S. Pat. No. 9,222,895 issued on Dec. 29, 2015 to Duffy et al., both of which are incorporated by reference as if fully set forth herein. The embodiments described herein may be further configured as described in these patents. For example, the one or more computer subsystems described herein may be further configured as described in these patents. In addition, configuring the one or more virtual systems as a central compute and storage (CCS) system may be performed as described in the above-referenced patent to Duffy. The persistent storage mechanisms described herein can have distributed computing and storage such as the CCS architecture, but the embodiments described herein are not limited to that architecture.

As further noted above, the imaging system may be configured to generate images of the specimen with multiple modes. In general, a "mode" can be defined by the values of parameters of the imaging system used for generating images of a specimen or the output used to generate images of the specimen. Therefore, modes that are different may be different in the values for at least one of the imaging parameters of the imaging system. For example, in one embodiment of an optical based imaging system, at least one of the multiple modes uses at least one wavelength of light for illumination that is different from at least one wavelength of the light for illumination used for at least one other of the multiple modes. The modes may be different in the illumination wavelength as described further herein (e.g., by using different light sources, different spectral filters, etc.) for different modes. In another embodiment, at least one of the multiple modes uses an illumination channel of the imaging system that is different from an illumination channel of the imaging system used for at least one other of the multiple modes. For example, as noted above, the imaging system may include more than one illumination channel. As such, different illumination channels may be used for different modes.

In one embodiment, the imaging system is an inspection system. For example, the optical and electron beam imaging systems described herein may be configured as inspection systems. In another embodiment, the imaging system is a defect review system. For example, the optical and electron beam imaging systems described herein may be configured as defect review systems. In a further embodiment, the imaging system is a metrology system. For example, the optical and electron beam imaging systems described herein may be configured as metrology systems. In particular, the embodiments of the imaging systems described herein and shown in FIGS. 1 and 1a may be modified in one or more parameters to provide different imaging capability depending on the application for which they will be used. In one such example, the imaging system shown in FIG. 1 may be configured to have a higher resolution if it is to be used for defect review or metrology rather than for inspection. In other words, the embodiments of the imaging system shown in FIGS. 1 and 1a describe some general and various configurations for an imaging system that can be tailored in a number of manners that will be obvious to one skilled in the art to produce imaging systems having different imaging capabilities that are more or less suitable for different applications.

The one or more computer subsystems are configured for acquiring a low resolution image of a specimen. Acquiring the low resolution image may be performed using one of the imaging systems described herein (e.g., by directing light or an electron beam to the specimen and detecting light or an electron beam, respectively, from the specimen). In this manner, acquiring the low resolution image may be performed using the physical specimen itself and some sort of imaging hardware. However, acquiring the low resolution image does not necessarily include imaging the specimen using imaging hardware. For example, another system and/or method may generate the low resolution image and may store the generated low resolution image in one or more storage media such as a virtual inspection system as described herein or another storage media described herein. Therefore, acquiring the low resolution image may include acquiring the low resolution image from the storage media in which it has been stored.

In some embodiments, the low resolution image is generated by an inspection system. For example, as described herein, the low resolution image may be generated by an inspection system that is configured to have a lower resolution to thereby increase its throughput. The inspection system may be an optical inspection system or an electron beam inspection system. The inspection system may have any configuration described further herein.

In one embodiment, the low resolution image is generated by an electron beam based imaging system. In another embodiment, the low resolution image is generated by an optical based imaging system. For example, the low resolution image may be generated by any of the electron beam based or optical based imaging systems described herein.

In one embodiment, the low resolution image is generated with a single mode of an imaging system. In another embodiment, one or more low resolution images are generated for the specimen with multiple modes of an imaging system. For example, the low resolution image(s) that are input to the deep convolutional neural network (deep CNN) as described further herein may include a single low resolution image that is generated with just a single mode of the imaging system. Alternatively, the low resolution images that are input to the deep CNN as described further herein may include multiple low resolution images that are generated with multiple modes of the imaging system (e.g., a first image generated with a first mode, a second image generated with a second mode, and so on). The single mode and the multiple modes may include any of the mode(s) described further herein.

The component(s), e.g., component(s) 100 shown in FIG. 1, executed by the computer subsystem(s), e.g., computer subsystem 36 and/or computer subsystem(s) 102, include deep CNN 104. The deep CNN includes one or more first layers configured for generating a representation of the low resolution image and one or more second layers configured for generating a high resolution image for the specimen from the representation of the low resolution image. In this manner, the embodiments described herein may use one of the deep CNNs described herein (e.g., one or more machine learning techniques) for transforming a low resolution image of a specimen to a high resolution image of the specimen. For example, as shown in FIG. 2, the deep CNN is shown as image transformation network 200. During production and/or runtime (i.e., after the image transformation network has been setup and/or trained, which may be performed as described further herein), the input to the image transformation network may be input low resolution (high throughput) image 202, and the output of the image transformation network may be output high resolution (high sensitivity) image 204.

Figure 3:
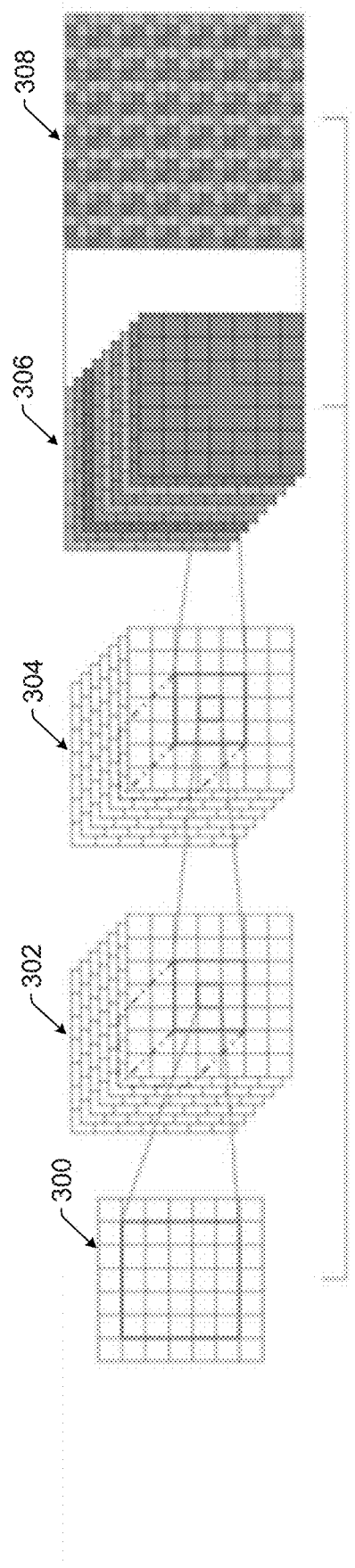
FIG. 3 is a schematic diagram illustrating one embodiment of a deep convolutional neural network that may be included in the embodiments described herein.

The one or more second layers include a final layer configured to output the high resolution layer, and the final layer is configured as a sub-pixel convolution layer. FIG. 3 illustrates one embodiment of an image transformation network architecture that may be suitable for use in the embodiments described herein. In this embodiment, the image transformation network is a deep CNN with a sub-pixel layer as the final layer. In this architecture, the input may be low resolution image 300, which is shown in FIG. 3 as simply a grid of pixels and not representing any particular low resolution image that can be generated by the embodiments described herein. The low resolution image may be input to one or more first layers 302 and 304, which may be configured as convolutional layers configured for feature maps extraction. These first layers may form the hidden layers of the image transformation network architecture.

The representation of the low resolution image generated by the one or more first layers may therefore be one or more features and/or feature maps. The features may have any suitable feature types known in the art that can be inferred from the input and used to generate the output described further herein. For example, the features may include a vector of intensity values per pixel. The features may also include any other types of features described herein, e.g., vectors of scalar values, vectors of independent distributions, joint distributions, or any other suitable feature types known in the art. As described further herein, the features are learned by the network during training and may or may not correlate with any actual features known in the art.

The one or more second layers include final layer 306, which is configured as a sub-pixel convolutional layer that aggregates the feature maps from low resolution space and builds high resolution image 308 in a single step. The sub-pixel convolution layer learns an array of upscaling filters to upscale the final low resolution feature maps into the high resolution output image. In this manner, the image transformation network may take a noisy, poorly resolved high throughput input image, compute the feature maps across the many convolution layers, and then transform the feature maps into the relatively quiet, super-resolved image using the sub-pixel layer. The sub-pixel convolution layer advantageously provides relatively complex upscaling filters specifically trained for each feature map while also reducing the computational complexity of overall operation. The deep CNN used in the embodiments described herein may be further configured as described by Shi et al., in "Real-Time Single Image and Video Super-Resolution Using an Efficient Sub-Pixel Convolutional Neural Network," September 2016, arXiv:1609.05158v2, which is incorporated by reference as if fully set forth herein.

The deep CNNs described herein may be generally classified as deep learning models. Generally speaking, "deep learning" (also known as deep structured learning, hierarchical learning or deep machine learning) is a branch of machine learning based on a set of algorithms that attempt to model high level abstractions in data. In a simple case, there may be two sets of neurons: ones that receive an input signal and ones that send an output signal. When the input layer receives an input, it passes on a modified version of the input to the next layer. In a deep network, there are many layers between the input and output (and the layers are not made of neurons but it can help to think of it that way), allowing the algorithm to use multiple processing layers, composed of multiple linear and non-linear transformations.

Deep learning is part of a broader family of machine learning methods based on learning representations of data.

An observation (e.g., an image) can be represented in many ways such as a vector of intensity values per pixel, or in a more abstract way as a set of edges, regions of particular shape, etc. Some representations are better than others at simplifying the learning task (e.g., face recognition or facial expression recognition). One of the promises of deep learning is replacing handcrafted features with efficient algorithms for unsupervised or semi-supervised feature learning and hierarchical feature extraction.

Research in this area attempts to make better representations and create models to learn these representations from large-scale unlabeled data. Some of the representations are inspired by advances in neuroscience and are loosely based on interpretation of information processing and communication patterns in a nervous system, such as neural coding which attempts to define a relationship between various stimuli and associated neuronal responses in the brain.

The deep CNNs described herein may also be classified as machine learning models. Machine learning can be generally defined as a type of artificial intelligence (AI) that provides computers with the ability to learn without being explicitly programmed. Machine learning focuses on the development of computer programs that can teach themselves to grow and change when exposed to new data. In other words, machine learning can be defined as the subfield of computer science that "gives computers the ability to learn without being explicitly programmed." Machine learning explores the study and construction of algorithms that can learn from and make predictions on data—such algorithms overcome following strictly static program instructions by making data driven predictions or decisions, through building a model from sample inputs.

The machine learning described herein may be further performed as described in "Introduction to Statistical Machine Learning," by Sugiyama, Morgan Kaufmann, 2016, 534 pages; "Discriminative, Generative, and Imitative Learning," Jebara, MIT Thesis, 2002, 212 pages; and "Principles of Data Mining (Adaptive Computation and Machine Learning)," Hand et al., MIT Press, 2001, 578 pages; which are incorporated by reference as if fully set forth herein. The embodiments described herein may be further configured as described in these references.

The deep CNN is also a generative model. A "generative" model can be generally defined as a model that is probabilistic in nature. In other words, a "generative" model is not one that performs forward simulation or rule-based approaches and, as such, a model of the physics of the processes involved in generating an actual image (for which a simulated image is being generated) is not necessary. Instead, as described further herein, the generative model can be learned (in that its parameters can be learned) based on a suitable training set of data.

In one embodiment, the deep CNN is a deep generative model. For example, the deep CNN may be configured to have a deep learning architecture in that the model may include multiple layers, which perform a number of algorithms or transformations. The number of layers on one or both sides of the deep CNN may vary from that shown in the drawings described herein. For practical purposes, a suitable range of layers on both sides is from 2 layers to a few tens of layers.

The deep CNN may also be a deep neural network with a set of weights that model the world according to the data that it has been fed to train it. Neural networks can be generally defined as a computational approach which is based on a relatively large collection of neural units loosely modeling the way a biological brain solves problems with relatively large clusters of biological neurons connected by axons. Each neural unit is connected with many others, and links can be enforcing or inhibitory in their effect on the activation state of connected neural units. These systems are self-learning and trained rather than explicitly programmed and excel in areas where the solution or feature detection is difficult to express in a traditional computer program.

Neural networks typically consist of multiple layers, and the signal path traverses from front to back. The goal of the neural network is to solve problems in the same way that the human brain would, although several neural networks are much more abstract. Modern neural network projects typically work with a few thousand to a few million neural units and millions of connections. The neural network may have any suitable architecture and/or configuration known in the art.

The embodiments described herein may or may not be configured for training the deep CNN that is used to generate a high resolution image from a low resolution image. For example, another method and/or system may be configured to generate a trained deep CNN, which can then be accessed and used by the embodiments described herein. In general, training the deep CNN may include acquiring data (e.g., both low resolution images and high resolution images, which may include any of the low and high resolution images described herein). A training, testing, and validation dataset may then be constructed using a list of input tuples and expected output tuples. The input tuples may have the form of low resolution images, and the output tuples can be high resolution images corresponding to the low resolution images. The deep CNN may then be trained using the training dataset.

Figure 4:
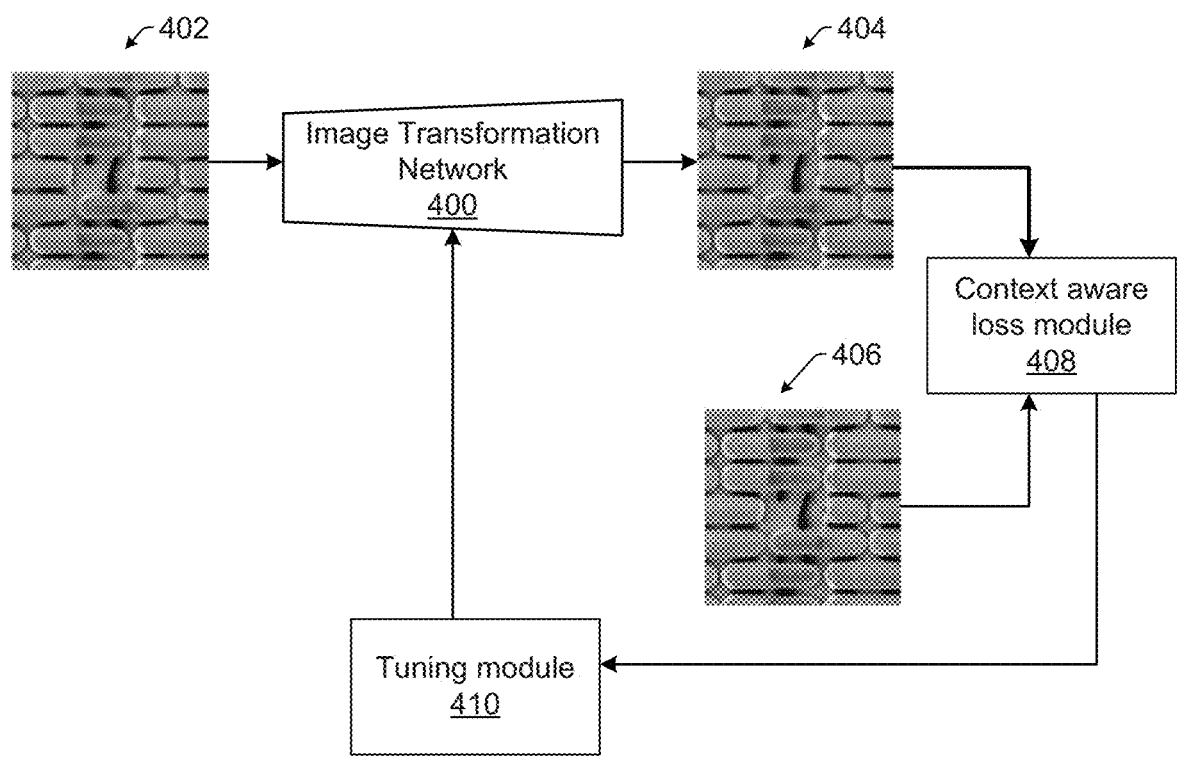
FIGS. 4 and 5 are block diagrams illustrating embodiments of one or more components that may be included in the embodiments described herein.

In one embodiment, the one or more components include a context aware loss module configured to train the deep CNN, and during training of the deep CNN, the one or more computer subsystems input the high resolution image generated by the one or more second layers and a corresponding, known high resolution image for the specimen into the context aware loss module and the context aware loss module determines context aware loss in the high resolution image generated by the one or more second layers compared to the corresponding, known high resolution image. For example, as shown in FIG. 4, the deep CNN network is shown as image transformation network 400. This figure shows the deep CNN during training or at setup time. The input to the image transformation network is low resolution (high throughput) image 402, which can be generated as described further herein. The image transformation network may then output high resolution (high sensitivity) image 404 as described further herein. The output high resolution image and corresponding, known high resolution image (e.g., a "ground truth" high sensitivity image) 406 may be input to context aware loss module 408. In this manner, the complete network architecture of the embodiments described herein may include two blocks, the image transformation network and the context aware loss. Context aware loss module 408 may compare the two images it receives as input (i.e., the high resolution image generated by the image transformation network and the high resolution image ground truth image, e.g., generated by an imaging system) to determine one or more differences between the two input images. The context aware loss module may be further configured as described herein.

In this manner, at setup time, the embodiments take the noisy, poorly resolved and quiet, super-resolved image pairs and then learn the transformation matrix between them through a neural network using context aware loss. "Noisy"

as that term is used herein can be generally defined as an image that has a relatively low signal-to-noise ratio (SNR) while "quiet" as that term is used herein can be generally defined as an image that has a relatively high SNR. These terms are therefore used interchangeably herein. These image pairs can come from any of the imaging platforms that are commercially available from KLA-Tencor (and other companies) like ebeam, BBP tools, a limited resolution imaging tool, etc. Once the training is complete, the network learns the transformation from noisy, poorly resolved images to quiet, super-resolved images while maintaining spatial fidelity. In this manner, the embodiments described herein use a data-driven approach to exploit the data redundancy observed in semiconductor images by learning a transformation between the noisy, poorly resolved images to quiet super-resolved images. The trained network can then be deployed in production where the imaging system generates noisy high throughput data which is then transformed into corresponding low noise, super-resolved data using the trained image transformation network. Once in production, the network performs like a typical post-processing algorithm.

Figure 5:
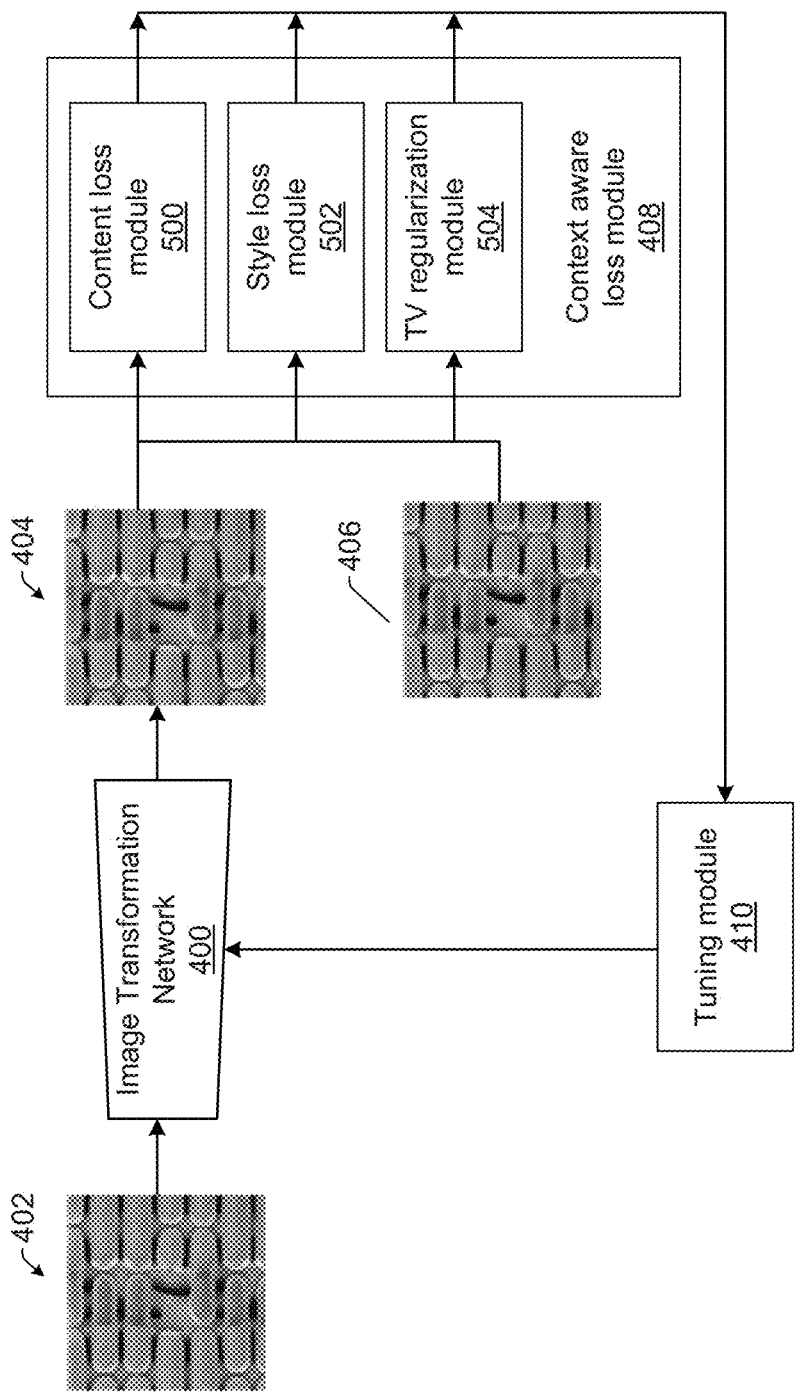

In one such embodiment, the context aware loss includes content loss, style loss, and total variation (TV) regularization. FIG. 5 shows one such embodiment. In particular, context aware loss module 408 shown in FIG. 4 may include content loss module 500, style loss module 502, and TV regularization module 504, as shown in FIG. 5. For example, the context aware loss is a generic framework and is represented through style and content loss. Deep neural networks tend to progressively learn image features starting from edges, contours in the lower layers to more complex features like faces or perhaps whole objects in the later layers. This correlates well with biological vision. We hypothesize that the lower layers of a convolution network learn features that are considered perceptually important. We thus design our context aware loss on top of the activations of the learned network. The context aware loss mainly consists of style, content, and regularization loss.

In one such embodiment, the content loss includes loss in low level features of the corresponding, known high resolution image. For example, the content of an image is defined as the lower level features like edges, contours, etc. The minimization of content loss helps preserve these low level features which are important for generating metrology quality, super-resolved images. To be more clear, content loss is included in the loss function to preserve edges and contours in the images since these are important for use in measurements etc. on the high resolution images. Traditional techniques like Bicubic interpolation etc. or training with an L2 loss do not need to guarantee such preservation of edges and contours.

The next major part of the loss is called style transfer loss. In one such embodiment, the style loss includes loss in one or more abstract entities that qualitatively define the corresponding, known high resolution image. For example, we define the style as an abstract entity that qualitatively defines the image, including properties like sharpness, texture, color, etc. One reason for using deep learning as described herein is that the differences between the low resolution/high resolution images described herein is not just the resolution, but they can have different noise characteristics, charging artifacts, texture, etc. Thus, just super-resolving the low resolution images is not sufficient, and a mapping from low resolution to high resolution images is learned using deep learning. The style of an image is characterized by the upper layer activations of a trained network. The style and content loss, in combination, makes it possible for the image transformation network to learn the transformation between noisy, poorly resolved images to quiet super-resolved images. Once the image transformation network is trained using the context aware loss, it can be deployed in production to generate quiet, super-resolved images from noisy, poorly resolved, high throughput images while maintaining spatial fidelity. In some embodiments, the style transfer loss is defined as the loss between the final layer features of the super-resolution high resolution images (i.e., the images generated by the one or more second layers) and the ground truth high resolution images, which is particularly the case when we want to do classification on the super-resolved high resolution images.

Figure 6:
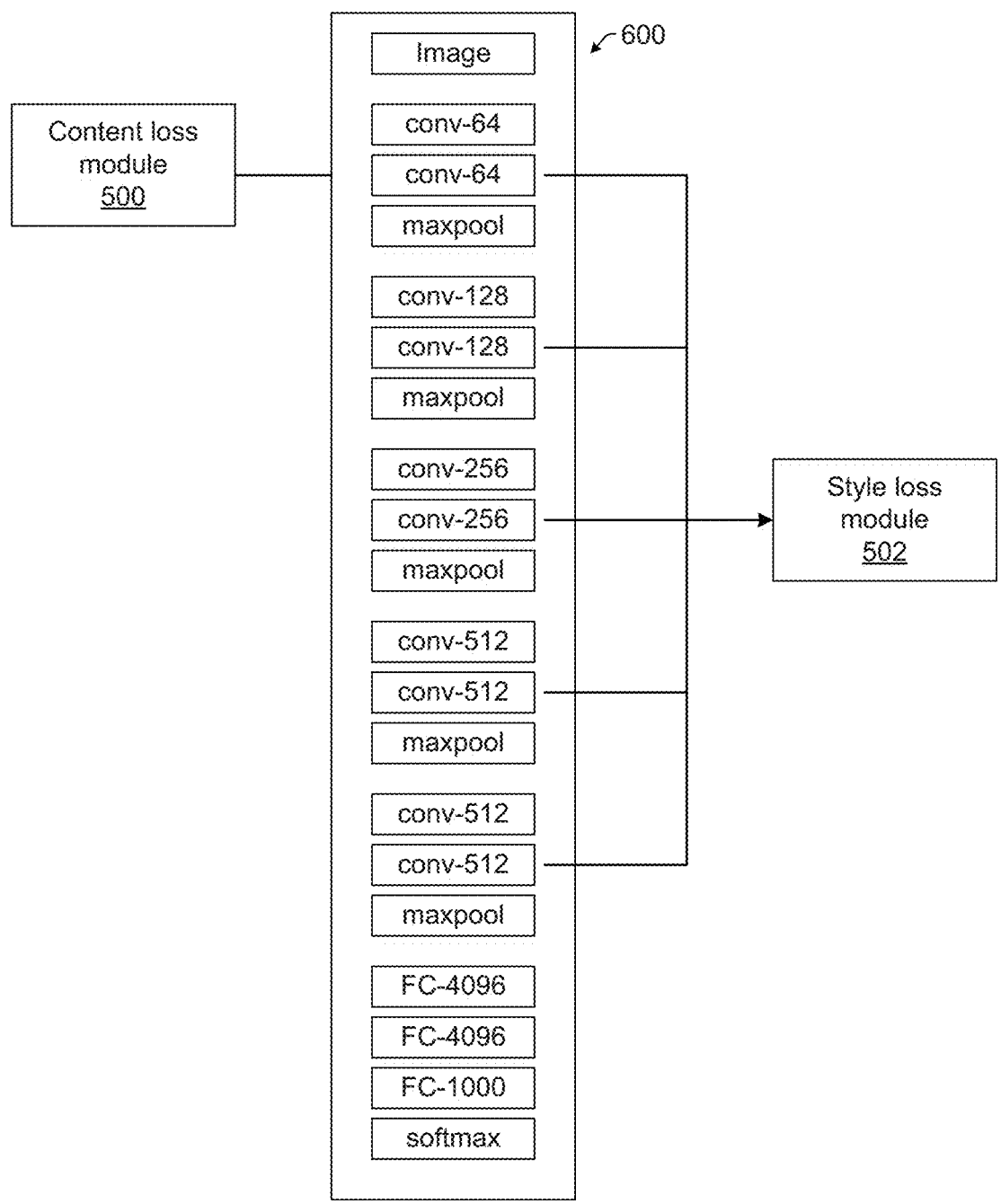
FIG. 6 is a block diagram illustrating one embodiment of a pre-trained VGG network that may be included in a context aware loss module embodiment.

In a further such embodiment, the context aware loss module includes a pre-trained VGG network. FIG. 6 shows how the activations from a pre-defined network are used to calculate the style and content loss. For example, as shown in FIG. 6, pre-trained VGG network 600 may be coupled to content loss module 500 and style loss module 502. VGG16 (also called OxfordNet) is a convolutional neural network architecture named after the Visual Geometry Group from Oxford, who developed it. The VGG network may also be further configured as described by Simonyan et al., in "Very Deep Convolutional Networks for Large-Scale Image Recognition," arXiv:1409.1556v6, April 2015, 14 pages, which is incorporated by reference as if fully set forth herein. As shown in FIG. 6, the pre-trained VGG network may take an image input to a number of layers including convolutional layers (e.g., conv-64, conv-128, conv-256, and conv-512), maxpool layers, fully connected layers (e.g., FC-4096), and a softmax layer, all of which may have any suitable configuration known in the art.

The activations from the VGG network may be acquired by content loss module 500 and style loss module 502 to thereby calculate the style and content loss. The embodiments described herein therefore define a novel loss framework for training neural networks using pre-trained networks. This helps in optimizing neural networks while preserving use case critical features in the generated images.

The embodiments described herein therefore introduce use case dependent loss functions using a pre-trained deep learning network. Traditional techniques include methods like Bicubic interpolation etc., and L2 loss when training the deep network, but we introduce different losses during training our networks. For example, Bicubic interpolation decreases contrast loss on sharp edges, while L2 loss over the full image focuses on preserving all aspects of an image, but the preservation of most of them is not necessarily a requirement for the use cases of the embodiments described herein, and we can create loss functions depending on what features in an image we want to preserve. In some such examples, content loss can be used to ensure the edges and contours are preserved, and style loss can be used to ensure textures, color, etc. are preserved.

The embodiments described herein may use outputs from a pre-trained network layer to define a use case dependent loss function for training the network. If the use case is critical dimension uniformity or metrology measurements, the embodiments can give weight to content loss, and if the images are to be "beautified," style loss can be used to preserve texture, color, etc. In addition, for the case where classification is important, the last layer features can be matched between the generated high resolution image and the ground truth image, and the loss on the last layer of features of the pre-trained network can be defined since these are the features used for classification.

In signal processing, total variation denoising, also known as total variation regularization, is a process, most often used in digital image processing, that has applications in noise removal. It is based on the principle that signals with excessive and possibly spurious detail have high total variation, that is, the integral of the absolute gradient of the signal is high. According to this principle, reducing the total variation of the signal subject to it being a close match to the original signal, removes unwanted detail whilst preserving important details such as edges. The concept was pioneered by Rudin, Osher, and Fatemi in 1992 and so is today known as the ROF model.

This noise removal technique has advantages over simple techniques such as linear smoothing or median filtering which reduce noise but at the same time smooth away edges to a greater or lesser degree. By contrast, total variation denoising is remarkably effective at simultaneously preserving edges whilst smoothing away noise in flat regions, even at relatively low signal-to-noise ratios.

In some such embodiments, the one or more components include a tuning module configured to determine one or more parameters of the deep CNN based on the context aware loss. For example, as shown in FIG. 4, the one or more components may include tuning module 410 configured for back propagation of errors determined by the context aware loss module and/or changing network parameters. Each of the layers of the deep CNN described above may have one or more parameters such as weights, W, and biases, B, whose values can be determined by training the model, which may be performed as described further herein. For example, the weights and biases of the various layers included in the deep CNN may be determined during training by minimizing the context aware loss.

In one embodiment, the deep CNN is configured such that the high resolution image generated by the one or more second layers has less noise than the low resolution image. For instance, the embodiments described herein provide a generalized framework for transforming noisy and under-resolved images to low noise super-resolved images using learned representations.

In another embodiment, the deep CNN is configured such that the high resolution image generated by the one or more second layers retains structural and spatial features of the low resolution image. For instance, the embodiments described herein provide a generalized framework for transforming noisy and under-resolved images to low noise super-resolved images while retaining structural and spatial fidelity using learned representations.

In some embodiments, the deep convolutional neural network outputs the high resolution image at a throughput that is higher than a throughput for generating the high resolution image with a high resolution imaging system. For example, the embodiments described herein can be used for deep learning based super-resolution for higher throughput on electron beam tools. The embodiments described herein may therefore be particularly useful when it may be advantageous to use a relatively low dose (electron beam, light, etc.) for image acquisition to prevent making changes to the specimen (such as damage, contamination, etc.). However, using a relatively low dose to avoid changes to the specimen generally produces low resolution images. The challenge therefore is generating high resolution images without causing changes to the specimen. The embodiments described herein provide this capability. In particular, the specimen images can be acquired at a higher throughput and a lower resolution (or lower quality), and the embodiments described herein can convert those higher throughput, lower quality images into super-resolved or higher quality images without causing changes to the specimen (because the specimen itself is not needed to generate super-resolved or higher quality images).

The embodiments described herein are therefore particularly useful for the review use case where a wafer may go through the inspection (e.g., BBP inspection) and electron beam review sequence. In addition, in some instances, the user wants to put the wafer back on the inspection tool after inspection to try another inspection recipe condition (e.g., to optimize inspection recipe conditions for a defect detected in inspection and possibly classified in review). However, if the electron beam (or other) review damaged or changed the locations that were reviewed, those sites are no longer valid for sensitivity analysis (i.e., inspection recipe alteration and/or optimization). Therefore, preventing damage or changes to the specimen by using low frame average electron beam image acquisition is one of the advantages for deep learning based classification of electron beam review images (e.g., you don't need pristine high frame average images). Thus, the deep learning classification and deep learning image improvement could arguably be used in combination. Deep learning based defect classification can be performed by the embodiments described herein as described in commonly assigned U.S. patent application Ser. No. 15/697,426 filed Sep. 6, 2017 by He et al., which is incorporated by reference as if fully set forth herein. The embodiments described herein may be further configured as described in this patent application.

Figure 7:
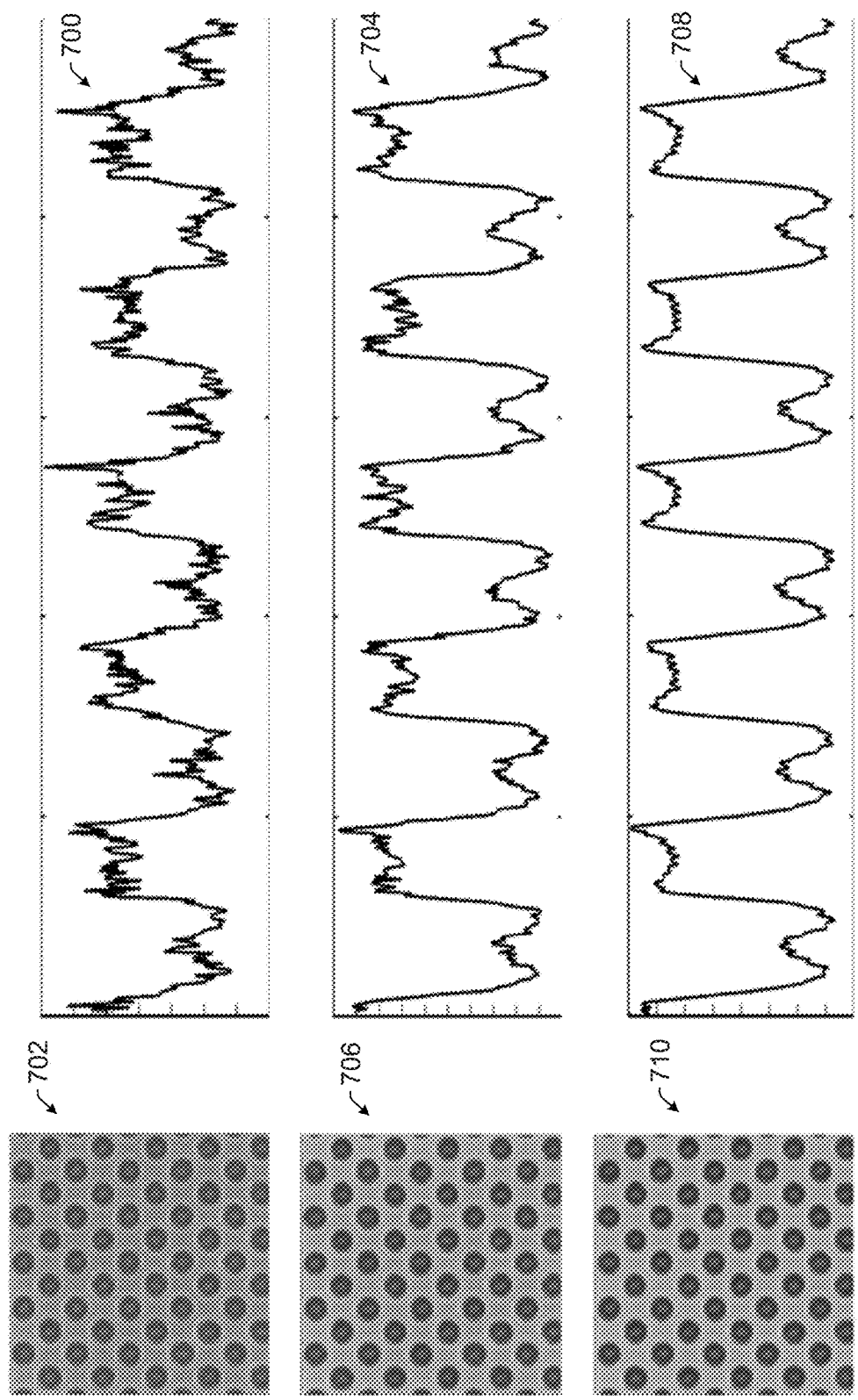
FIG. 7 includes examples of corresponding high and low resolution images generated by an imaging system and a high resolution image generated from the low resolution image by the embodiments described herein and line profiles generated for each of the images.

FIG. 7 illustrates examples of results that may be produced using the embodiments described herein. The results show a comparison between horizontal profile 700 of noisy, poorly resolved, high throughput image 702, horizontal profile 704 of higher quality, better resolved, low throughput image 706, and horizontal profile 708 of quiet, super-resolved image 710 obtained by processing of the low resolution image using the embodiments described herein. High throughput image 702 and low throughput image 706 are generated by low and high resolution imaging systems, respectively, as described herein. In this manner, the results shown in FIG. 7 illustrate horizontal variation between the different images along the same line profile through the images. The results shown in FIG. 7 demonstrate the ability of the embodiments described herein to generate substantially noise-free, high resolution images from lower quality images while maintaining structural and spatial fidelity in the images as confirmed by the correlation in the profiles (708 and 704) of the super-resolved image generated by the embodiments described herein and the high resolution image generated by an imaging system.

Figure 8:
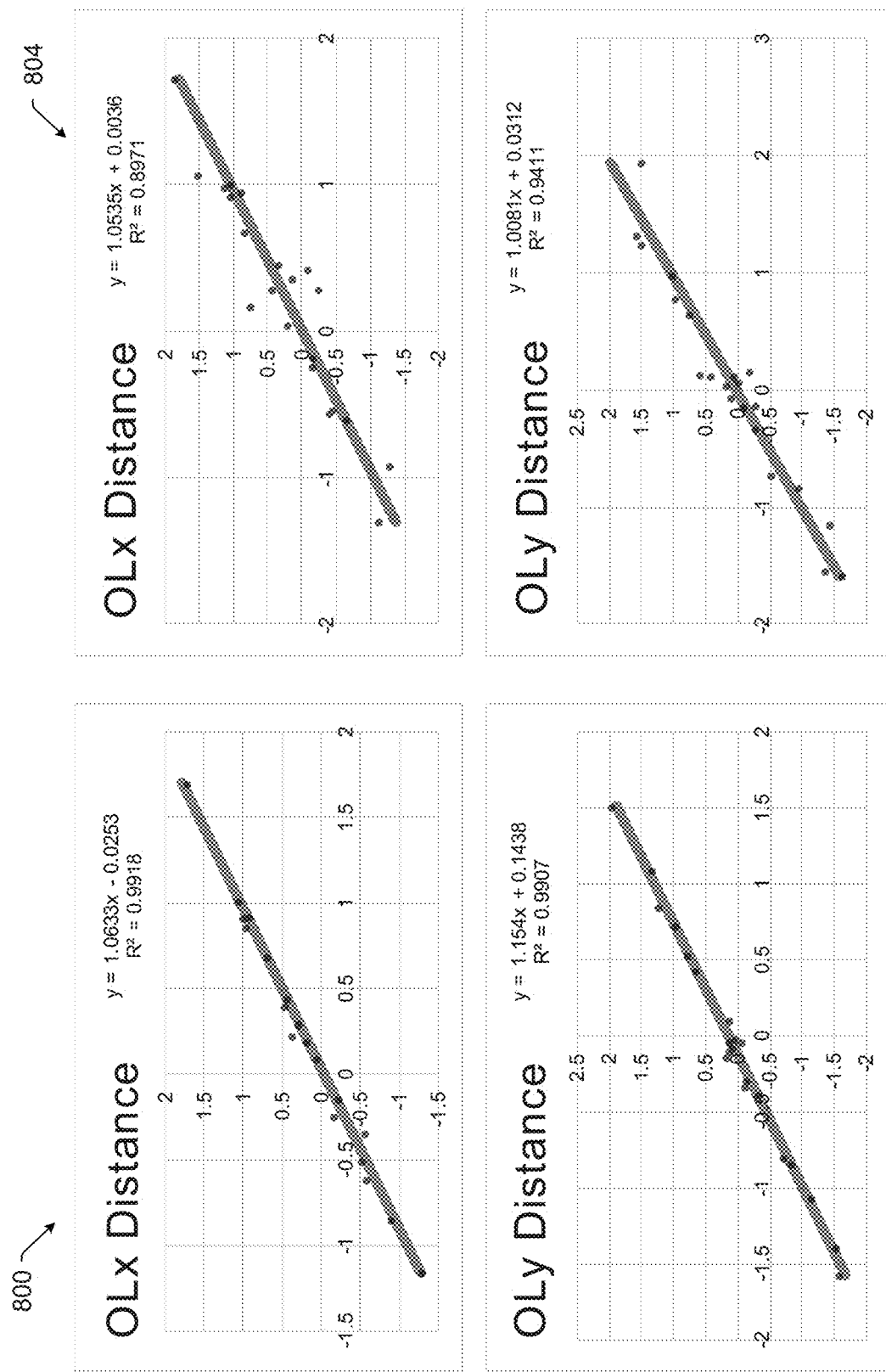
FIG. 8 includes examples of correlation in results of overlay measurements along the x and y axes between a high resolution image generated by an imaging system and a high resolution image generated by the embodiments described herein and between low and high resolution images generated by the imaging system.

In one embodiment, the one or more computer subsystems are configured to perform one or more metrology measurements for the specimen based on the high resolution image generated by the one or more second layers. FIG. 8 proves that the embodiments described herein work by closing the loop with the ground truth data. In order to further test the embodiments described herein in real world metrology use cases, overlay measurements were carried out on the three sets of images shown in FIG. 7 and the results are compiled in FIG. 8. Graphs 800 and 802 in FIG. 8 depict the correlation in overlay measurements along the x and y axes, respectively, between the high resolution imaging system generated image and the high resolution image generated by the deep CNN embodiments described herein, and graphs 804 and 806 in FIG. 8 depict the correlation in overlay measurements along the x and y axes, respectively, between the high resolution imaging system generated image and the lower resolution image. The metric used for calculating the correlation is $R^2$, r-squared. An r-squared value of 1 depicts a perfect fit. The close to perfect $R^2$ value (>0.99) between the imaging system generated high resolution image and the deep CNN generated high resolution image shows that the deep CNN generated image can be used in place of higher resolution imaging system generated images in metrology measurements without affecting the performance. Given the relatively high precision required in metrology use cases, the $R^2$ value of ~0.8 in the case of the low and high resolution imaging system generated images proves too low to get accurate measurements, and hence the measurements need to be taken from higher resolution images which lower the use case throughput considerably (e.g., from about 18K defects per hour to about 8K defects per hour in the experiments described herein).

In another embodiment, the deep CNN functions independently of the imaging system that generated the low resolution image. In some embodiments, the low resolution image is generated by one imaging system having a first imaging platform, the one or more computer subsystems are configured for acquiring another low resolution image generated for another specimen by another imaging system having a second imaging platform that is different than the first imaging platform, the one or more first layers are configured for generating a representation of the other low resolution image, and the one or more second layers are configured for generating a high resolution image for the other specimen from the representation of the other low resolution image. For example, an important benefit of the embodiments described herein is that the same network architecture can be used to enhance images from different platforms like BBP tools, tools configured specifically for low resolution imaging, etc. Moreover, the entire burden of optimization and learning representations is shifted offline as the training only happens during recipe setup time. Once the training is complete, the runtime compute is drastically reduced. The learning process also helps in adaptively enhancing images without the need of changing parameters every time as is required in the case of old methods.

In one such embodiment, the first imaging platform is an electron beam imaging platform, and the second imaging platform is an optical imaging platform. For example, the embodiments described herein can transform low resolution images generated using an electron beam imaging system and an optical imaging system. The embodiments described herein are also capable of performing transformations for other different types of imaging platforms (e.g., other charged particle type imaging systems).

In another such embodiment, the first and second imaging platforms are different optical imaging platforms. In a further such embodiment, the first and second imaging platforms are different electron beam imaging platforms. For example, the first and second imaging platforms may be the same type of imaging platform, but can differ dramatically in their imaging capability. In one such example, the first and second optical imaging platforms may be a laser scattering imaging platform and a BBP imaging platform. These imaging platforms obviously have substantially different capabilities and will generate substantially different low resolution images. Nevertheless, the embodiments described herein can generate high resolution images for all of such low resolution images using the learned representations generated by training the deep CNN.

Another embodiment of a system configured to generate a high resolution image for a specimen from a low resolution image of the specimen includes an imaging subsystem configured for generating a low resolution image of a specimen. The imaging subsystem may have any configuration described herein. The system also includes one or more computer subsystems, e.g., computer subsystem(s) 102 shown in FIG. 1, which may be configured as described further herein, and one or more components, e.g., component(s) 100, executed by the one or more computer subsystems, which may include any of the component(s) described herein. The component(s) include a deep CNN, e.g., deep CNN 104, which may be configured as described herein. For example, the deep CNN includes one or more first layers configured for generating a representation of the low resolution image and one or more second layers configured for generating a high resolution image for the specimen from the representation of the low resolution image. The one or more second layers include a final layer configured to output the high resolution image. The final layer is also configured as a sub-pixel convolution layer. The one or more first and one or more second layers may be further configured as described further herein. This system embodiment may be further configured as described herein.

The embodiments described herein have a number of advantages as can be seen from the description provided above. For example, the embodiments described herein provide a generic, platform agnostic, data-driven framework. The embodiments learn the transformation between high and low quality images using training data during setup time. Learning this transformation enables the embodiments to transform the noisy, poorly resolved input into relatively quiet, super-resolved output with metrology quality at runtime using the learned transformation. Older approaches were parametric methods which only relied on the current input image and did not take advantage of any other training data. The embodiments described herein are also generic and platform agnostic. Because the embodiments are generic and platform agnostic, the same framework can be used to generate metrology quality images on different platforms like electron beam, BBP, laser scattering, low resolution imaging, and metrology platforms. The embodiments also enable higher throughput by generating the required quality images in production using only low quality (high throughput) images. The embodiments also achieve noise reduction in the output image as compared to the input image without affecting the important features like edges and contours in the images.

Each of the embodiments of each of the systems described above may be combined together into one single embodiment.

Another embodiment relates to a computer-implemented method for generating a high resolution image for a specimen from a low resolution image of the specimen. The method includes acquiring a low resolution image of a specimen. The method also includes generating a representation of the low resolution image by inputting the low resolution image into one or more first layers of a deep CNN. In addition, the method includes generating a high resolution image for the specimen based on the representation. Generating the high resolution image is performed by one or more second layers of the deep CNN. The one or more second layers include a final layer configured to output the high resolution image, and the final layer is configured as a sub-pixel convolution layer. The acquiring, generating the representation, and generating the high resolution image steps are performed by one or more computer systems. One or more components are executed by the one or more computer systems, and the one or more components include the deep CNN.

Each of the steps of the method may be performed as described further herein. The method may also include any other step(s) that can be performed by the system, computer system(s) or subsystem(s), and/or imaging systems or subsystems described herein. The one or more computer systems, the one or more components, and the deep CNN may be configured according to any of the embodiments described herein, e.g., computer subsystem(s) 102, component(s) 100, and deep CNN 104. In addition, the method described above may be performed by any of the system embodiments described herein.

All of the methods described herein may include storing results of one or more steps of the method embodiments in a computer-readable storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. For example, the generated high resolution images may be used to perform metrology measurements on the specimen, to classify one or more defects detected on the specimen, to verify one or more defects detected on the specimen, and/or to determine if, based on one or more of the above, the process used to form patterned features on the specimen should be altered in some manner to thereby change the patterned features formed on other specimens in the same process.

Figure 9:
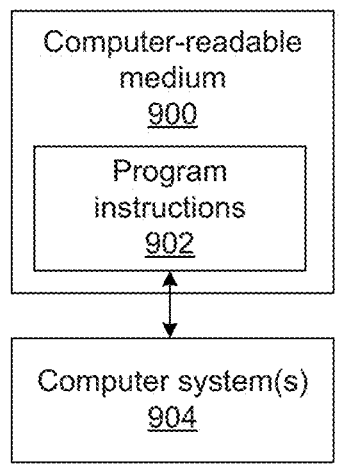
FIG. 9 is a block diagram illustrating one embodiment of a non-transitory computer-readable medium storing program instructions for causing one or more computer systems to perform a computer-implemented method described herein.

An additional embodiment relates to a non-transitory computer-readable medium storing program instructions executable on one or more computer systems for performing a computer-implemented method for generating a high resolution image for a specimen from a low resolution image of the specimen. One such embodiment is shown in FIG. 9. In particular, as shown in FIG. 9, non-transitory computer-readable medium 900 includes program instructions 902 executable on computer system(s) 904. The computer-implemented method may include any step(s) of any method (s) described herein.

Program instructions 902 implementing methods such as those described herein may be stored on computer-readable medium 900. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Computer system(s) 904 may be configured according to any of the embodiments described herein.

Further modifications and alternative embodiments of various aspects of the invention will be apparent to those skilled in the art in view of this description. For example, methods and systems for generating a high resolution image for a specimen from a low resolution image of the specimen are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured to generate a high resolution image for a specimen from a low resolution image of the specimen, comprising:
   one or more computer subsystems configured for acquiring a low resolution image of a specimen; and
   one or more components executed by the one or more computer subsystems, wherein the one or more components comprise:
      a deep convolutional neural network, wherein the deep convolutional neural network comprises:
         one or more first layers configured for generating a representation of the low resolution image; and
         one or more second layers configured for generating a high resolution image for the specimen from the representation of the low resolution image, wherein the one or more second layers comprise a final layer configured to output the high resolution image, and wherein the final layer is further configured as a sub-pixel convolution layer.

2. The system of claim 1, wherein the deep convolutional neural network is configured such that the high resolution image generated by the one or more second layers has less noise than the low resolution image.

3. The system of claim 1, wherein the deep convolutional neural network is configured such that the high resolution image generated by the one or more second layers retains structural and spatial features of the low resolution image.

4. The system of claim 1, wherein the one or more components further comprise a context aware loss module configured to train the deep convolutional neural network, wherein during training of the deep convolutional neural network, the one or more computer subsystems input the high resolution image generated by the one or more second layers and a corresponding, known high resolution image for the specimen into the context aware loss module and the context aware loss module determines context aware loss in the high resolution image generated by the one or more second layers compared to the corresponding, known high resolution image.

5. The system of claim 4, wherein the context aware loss comprises content loss, style loss, and total variation regularization.

6. The system of claim 5, wherein the content loss comprises loss in low level features of the corresponding, known high resolution image.

7. The system of claim 5, wherein the style loss comprises loss in one or more abstract entities that qualitatively define the corresponding, known high resolution image.

8. The system of claim 4, wherein the context aware loss module comprises a pre-trained VGG network.

9. The system of claim 4, wherein the one or more components further comprise a tuning module configured to determine one or more parameters of the deep convolutional neural network based on the context aware loss.

10. The system of claim 1, wherein the one or more computer subsystems are further configured to perform one or more metrology measurements for the specimen based on the high resolution image generated by the one or more second layers.

11. The system of claim 1, wherein the deep convolutional neural network functions independently of an imaging system that generated the low resolution image.

12. The system of claim 1, wherein the low resolution image is generated by one imaging system having a first imaging platform, wherein the one or more computer subsystems are further configured for acquiring another low resolution image generated for another specimen by another imaging system having a second imaging platform that is different than the first imaging platform, wherein the one or more first layers are configured for generating a representation of the another low resolution image, and wherein the one or more second layers are further configured for generating a high resolution image for the another specimen from the representation of the another low resolution image.

13. The system of claim 12, wherein the first imaging platform is an electron beam imaging platform, and wherein the second imaging platform is an optical imaging platform.

14. The system of claim 12, wherein the first and second imaging platforms are different optical imaging platforms.

15. The system of claim 12, wherein the first and second imaging platforms are different electron beam imaging platforms.

16. The system of claim 1, wherein the low resolution image is generated by an electron beam based imaging system.

17. The system of claim 1, wherein the low resolution image is generated by an optical based imaging system.

18. The system of claim 1, wherein the low resolution image is generated by an inspection system.

19. The system of claim 1, wherein the specimen is a wafer.

20. The system of claim 1, wherein the specimen is a reticle.

21. The system of claim 1, wherein the deep convolutional neural network outputs the high resolution image at a throughput that is higher than a throughput for generating the high resolution image with a high resolution imaging system.

22. A system configured to generate a high resolution image for a specimen from a low resolution image of the specimen, comprising:
- an imaging subsystem configured for generating a low resolution image of a specimen;
- one or more computer subsystems configured for acquiring the low resolution image of the specimen; and
- one or more components executed by the one or more computer subsystems, wherein the one or more components comprise:
    - a deep convolutional neural network, wherein the deep convolutional neural network comprises:
        - one or more first layers configured for generating a representation of the low resolution image; and
        - one or more second layers configured for generating a high resolution image for the specimen from the representation of the low resolution image, wherein the one or more second layers comprise a final layer configured to output the high resolution image, and wherein the final layer is further configured as a sub-pixel convolution layer.

23. A non-transitory computer-readable medium, storing program instructions executable on one or more computer systems for performing a computer-implemented method for generating a high resolution image for a specimen from a low resolution image of the specimen, wherein the computer-implemented method comprises:
- acquiring a low resolution image of a specimen;
- generating a representation of the low resolution image by inputting the low resolution image into one or more first layers of a deep convolutional neural network; and
- generating a high resolution image for the specimen based on the representation, wherein generating the high resolution image is performed by one or more second layers of the deep convolutional neural network, wherein the one or more second layers comprise a final layer configured to output the high resolution image, wherein the final layer is further configured as a sub-pixel convolution layer, wherein said acquiring, said generating the representation, and said generating the high resolution image are performed by the one or more computer systems, wherein one or more components are executed by the one or more computer systems, and wherein the one or more components comprise the deep convolutional neural network.

24. A computer-implemented method for generating a high resolution image for a specimen from a low resolution image of the specimen, comprising:
- acquiring a low resolution image of a specimen;
- generating a representation of the low resolution image by inputting the low resolution image into one or more first layers of a deep convolutional neural network; and
- generating a high resolution image for the specimen based on the representation, wherein generating the high resolution image is performed by one or more second layers of the deep convolutional neural network, wherein the one or more second layers comprise a final layer configured to output the high resolution image, wherein the final layer is further configured as a sub-pixel convolution layer, wherein said acquiring, said generating the representation, and said generating the high resolution image are performed by one or more computer systems, wherein one or more components are executed by the one or more computer systems, and wherein the one or more components comprise the deep convolutional neural network.

* * * * *